United States Patent

Bulatowicz et al.

(10) Patent No.: US 9,651,378 B2
(45) Date of Patent: May 16, 2017

(54) NUCLEAR MAGNETIC RESONANCE GYROSCOPE SYSTEM

(71) Applicants: Michael D. Bulatowicz, Canoga Park, CA (US); Michael S. Larsen, Woodland Hills, CA (US)

(72) Inventors: Michael D. Bulatowicz, Canoga Park, CA (US); Michael S. Larsen, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 587 days.

(21) Appl. No.: 14/188,405

(22) Filed: Feb. 24, 2014

(65) Prior Publication Data

US 2015/0241217 A1 Aug. 27, 2015

(51) Int. Cl.
*G01C 19/60* (2006.01)
*G01C 19/62* (2006.01)

(52) U.S. Cl.
CPC ............. *G01C 19/60* (2013.01); *G01C 19/62* (2013.01)

(58) Field of Classification Search
CPC ................................ G01C 19/60; G01C 19/62
See application file for complete search history.

(56) References Cited

U.S. PATENT DOCUMENTS

| | | | |
|---|---|---|---|
| 7,359,059 B2 | 4/2008 | Lust et al. | |
| 7,863,894 B2 | 1/2011 | Hall | |
| 8,054,074 B2 | 11/2011 | Ichihara et al. | |
| 8,159,220 B2 | 4/2012 | Bulatowicz et al. | |
| 8,405,389 B2 | 3/2013 | Sugioka et al. | |
| 2012/0191396 A1* | 7/2012 | Griffith | G01C 19/62 702/92 |

FOREIGN PATENT DOCUMENTS

| | | |
|---|---|---|
| GB | 2137357 A | 10/1984 |
| JP | 54-92776 | 7/1979 |
| JP | 2011-033629 A | 2/2011 |
| WO | WO-2012/099819 A1 | 7/2012 |

OTHER PUBLICATIONS

European Search Report for corresponding EP2910900 A1 published on Aug. 26, 2015; completed on Jul. 21, 2015.
Office Action for corresponding JP 2015-031905, mailed Jan. 26, 2016.

* cited by examiner

*Primary Examiner* — Gregory H Curran
(74) *Attorney, Agent, or Firm* — Tarolli, Sundheim, Covell & Tummino LLP

(57) ABSTRACT

One embodiment includes a nuclear magnetic resonance (NMR) gyroscope system. The system includes a vapor cell that encloses an alkali metal and a gyromagnetic isotope. The system also includes a magnetic field source that generates a magnetic field aligned with a sensitive axis of the NMR gyroscope system and which is provided through the vapor cell to cause the alkali metal and the gyromagnetic isotope to precess. The system also includes a laser that generates an optical beam that polarizes the alkali metal in the vapor cell to facilitate the precession of the alkali metal and the gyromagnetic isotope. The system further includes an angular rotation sensor configured to calculate a rotation angle about the sensitive axis based on a measured characteristic of a detection beam corresponding to the optical beam exiting the vapor cell, the characteristic being associated with the precession of the gyromagnetic isotope.

19 Claims, 3 Drawing Sheets

NUCLEAR MAGNETIC RESONANCE GYROSCOPE SYSTEM

TECHNICAL FIELD

The present invention relates generally to sensor systems, and specifically to a nuclear magnetic resonance gyroscope system.

BACKGROUND

A typical nuclear magnetic resonance (NMR) gyroscope operates on the principle of sensing inertial angular rotation rate or orientation angle about a sensitive axis based on a shift in the measured Larmor precession frequency or phase of one or two isotopes that possess nuclear magnetic moments. An NMR gyroscope system can include a vapor cell and a rotation sensor that includes, for example, a light source, a photodetector, and signal processing circuitry. As an example, the vapor cell can contain one or more alkali metals, such as Rubidium, together with one or more gyromagnetic isotopes that are caused to precess in response to a magnetic field. The signal processing circuitry can extract the Larmor precession frequency and/or phase information of the one or more gyromagnetic isotopes. As a result, a gyroscope rotation rate or orientation angle about the sensitive axis can be calculated based on the extracted Larmor precession frequencies and phase information.

SUMMARY

One embodiment includes a nuclear magnetic resonance (NMR) gyroscope system. The system includes a vapor cell that encloses an alkali metal and a gyromagnetic isotope. The system also includes a magnetic field source that generates a magnetic field aligned with a sensitive axis of the NMR gyroscope system and which is provided through the vapor cell to cause the alkali metal and the gyromagnetic isotope to precess. The system also includes a laser that generates an optical beam that polarizes the alkali metal in the vapor cell to facilitate the precession of the alkali metal and the gyromagnetic isotope. The system further includes an angular rotation sensor configured to calculate a rotation angle about the sensitive axis based on a measured characteristic of a detection beam corresponding to the optical beam exiting the vapor cell, the characteristic being associated with the precession of the gyromagnetic isotope.

Another embodiment of the invention includes a method for determining a rotation angle about a sensitive axis in an NMR gyroscope system. The method includes providing a magnetic field that is aligned with a sensitive axis of the NMR gyroscope system through a vapor cell that is sealed to enclose an alkali metal and a gyromagnetic isotope. The method also includes providing an optical beam through the vapor cell at an offset angle relative to the magnetic field to polarize the alkali metal to facilitate precession of the alkali metal and the gyromagnetic isotope in response to the magnetic field. The method further includes monitoring an intensity of a detection beam corresponding to the optical beam exiting the vapor cell and calculating a rotation angle about the sensitive axis based on the intensity of the detection beam.

Another embodiment of the invention includes an NMR gyroscope system. The system includes a vapor cell that is sealed to enclose an alkali metal and a gyromagnetic isotope. The system also includes a magnetic field source configured to generate a first magnetic field that is aligned with a sensitive axis of the NMR gyroscope system and a second magnetic field orthogonally with respect to the first magnetic field. The first and second magnetic fields can be provided through the vapor cell to cause the alkali metal and the gyromagnetic isotope to precess. The system also includes a laser configured to generate an optical beam that is provided through the vapor cell at an offset angle relative to the first magnetic field and which polarizes the alkali metal in the vapor cell to facilitate the precession of the alkali metal and the gyromagnetic isotope. The system further includes an angular rotation sensor configured to calculate a rotation angle about the sensitive axis based on an intensity of a detection beam corresponding to the optical beam exiting the vapor cell that is measured via a photodetector.

DETAILED DESCRIPTION

The present invention relates generally to sensor systems, and specifically to a nuclear magnetic resonance (NMR) gyroscope system. The NMR gyroscope system can include a vapor cell having alkali metal and at least one gyromagnetic isotope. A magnetic field source can generate a substantially uniform magnetic field that is provided through the vapor cell and which is aligned with a sensitive axis of the NMR gyroscope system. A laser can generate an optical beam that is provided through the vapor cell to polarize the alkali metal, thus facilitating precession of the alkali metal and the gyromagnetic isotope in response to the magnetic field. As an example, the system can also include a second magnetic field source to generate a magnetic field orthogonal to the first magnetic field, thus providing a net magnetic field that is misaligned with the sensitive axis to induce the alkali metal and the gyromagnetic isotope to precess. For example, the second magnetic field can have a frequency corresponding to a resonant frequency of the gyromagnetic isotope.

The system can also include a set of optics to circularly polarize the optical beam and to provide the optical beam through the vapor cell at an offset angle with respect to the first magnetic field. As an example, the offset angle can correspond to an optimum angle associated with a maximum signal-to-noise ratio (SNR) between minimum and maximum absorption of the optical beam by the alkali metal through a full period of precession of the alkali metal. Therefore, a detection beam corresponding to the optical beam exiting the vapor cell can have an intensity that is modulated by the precession frequency of the alkali metal. The system can include an angular rotation sensor that includes a photodetector to monitor the intensity of the detection beam. The angular rotation sensor can demodulate the detection beam at the precession frequency of the alkali metal to generate a demodulated signal that can have a frequency that is approximately equal to the precession of the gyromagnetic isotope. The angular rotation sensor can thus determine a rotation angle of the NMR gyroscope system based on the demodulated signal. For example, the demodulated signal can be compared to a frequency reference, such that the rotation angle can be determined based on the comparison (e.g., based on a phase or frequency difference).

Figure 1:
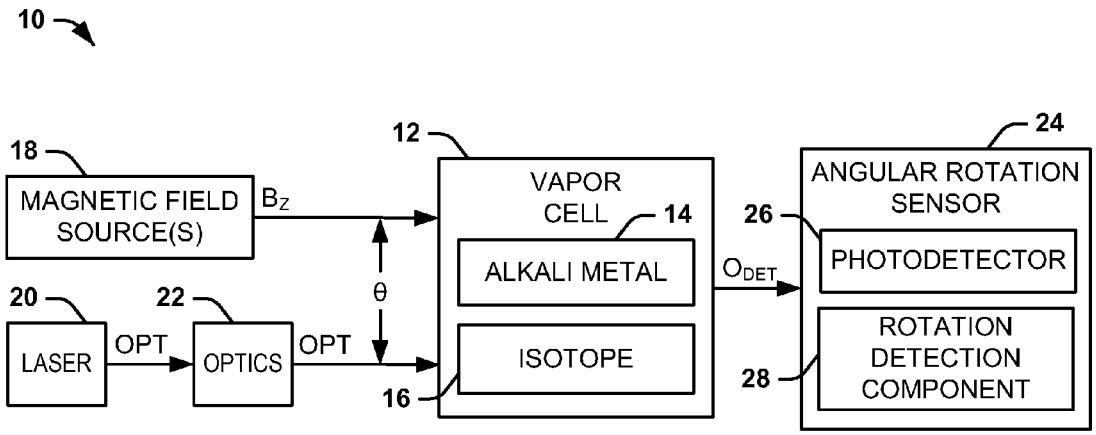
FIG. 1 illustrates an example of a nuclear magnetic resonance (NMR) gyroscope system.

FIG. 1 illustrates an example of a nuclear magnetic resonance (NMR) gyroscope system 10 in accordance with an aspect of the invention. The NMR gyroscope system 10 can be implemented in any of a variety of applications. As an example, the NMR gyroscope system 10 can be implemented in navigation systems for aircraft and/or spacecraft. In addition, the NMR gyroscope system 10 can be a portion of a multi-axis gyroscope system, such as demonstrated in greater detail in the example of FIG. 4.

The NMR gyroscope system 10 includes a vapor cell 12 that can be, for example, a glass casing of any of a variety of shapes and sizes. The vapor cell 12 includes an alkali metal 14 and a gyromagnetic isotope 16. As an example, the alkali metal 14 can be Rubidium (Rb) or Cesium (Cs) vapor, and the gyromagnetic isotope 16 can be any of a variety of noble gas isotopes, such as $^3$Helium, $^{83}$Krypton, $^{129}$Xenon, and/or $^{131}$Xenon. The NMR gyroscope system 10 also includes a magnetic field source 18 that is configured to generate a net magnetic field $B_Z$ through the vapor cell 12. For example, the magnetic field $B_Z$ can include an AC modulated DC magnetic field that is provided through the vapor cell 12 and which is aligned with a sensitive axis of the NMR gyroscope system 10. As an example, the magnetic field source 18 can be configured as a magnetic solenoid that substantially surrounds the vapor cell 12. In addition, the NMR gyroscope system 10 can include a magnetic shield (not shown) that can substantially surround the vapor cell 12, thus substantially mitigating interference from external magnetic fields, such as from the Earth magnetic field.

The NMR gyroscope system 10 also includes a laser 20 that provides an optical beam OPT that is provided via a set of optics 22 through the vapor cell 12. For example, the laser 20 can be configured as a vertical cavity surface-emitting laser (VCSEL) that can be controlled via a current signal (not shown) to provide a substantially stable wavelength of the optical beam OPT. As an example, the optics 22 can include a quarter-wave plate that is configured to circularly polarize the optical beam OPT, as well as a set of mirrors and/or lenses to substantially collimate the optical beam OPT and to provide the optical beam OPT through the vapor cell 12 at an offset angle θ relative to the magnetic field $B_Z$. The optical beam OPT can be configured to optically pump the alkali metal 14 in the vapor cell 12 to polarize the alkali metal 14 to facilitate precession of the alkali metal 14 based on the AC component of the magnetic field $B_Z$. Additionally, the gyromagnetic isotope 16 also precesses due to a spin-exchange process that spin-aligns the gyromagnetic isotope 16 with the alkali metal 14. As an example, the offset angle θ can correspond to an optimum angle associated with a maximum SNR between minimum and maximum absorption of the optical beam OPT by the alkali metal 14 through a full period of precession of the alkali metal 14.

Particularly, precessing particles of the alkali metal 14 are more likely to absorb photons of the optical beam OPT the closer they are to anti-parallel with the optical beam OPT in the precession period, and are least likely to absorb photons of the optical beam OPT the closer they are to parallel with the optical beam OPT in the precession period. Therefore, based on separating the optical beam OPT from the magnetic field $B_Z$, and thus the sensitive axis of the NMR gyroscope system 10, the precession of the alkali metal 14 can define an absorption profile of the optical beam OPT that varies across the period of the precession of the alkali metal 14. The optical beam OPT exits the vapor cell 12 as a detection beam $O_{DET}$ that has an intensity that varies across the period of the precession of the alkali metal 14 based on the variable absorption of photons of the optical beam OPT across the period of the precession of the alkali metal 14. Additionally, as described in greater detail below, the precession of the gyromagnetic isotope 16 can affect the precession of the alkali metal 14, and thus the intensity of the detection beam $O_{DET}$.

As a result, the intensity of the detection beam $O_{DET}$ corresponds to the precession of the alkali metal 14, as modified by the gyromagnetic isotope 16. Accordingly, as described herein, the intensity of the detection beam $O_{DET}$ can be indicative of rotation of the NMR gyroscope system 10 about the sensitive axis.

The NMR gyroscope system 10 further includes an angular rotation sensor 24. The angular rotation sensor 24 can be configured to measure a precession angle of the gyromagnetic isotope 16 based on the detection beam $O_{DET}$ to calculate a rotation angle about the sensitive axis of the NMR gyroscope system 10. The angular rotation sensor 24 includes a photodetector 26 and a rotation detection component 28. The photodetector 26 is configured to monitor the intensity of the detection beam $O_{DET}$ corresponding to the optical beam OPT exiting the vapor cell 12. As described previously, the modulated intensity of the detection beam $O_{DET}$ corresponds to the precession of the alkali metal 14, as modified by the gyromagnetic isotope 16. Thus, the rotation detection component 28 can be configured to demodulate the detection beam $O_{DET}$ to determine the precession of the gyromagnetic isotope 16. Accordingly, changes in the precession angle of the gyromagnetic isotope 16, as detected in the demodulated detection signal $O_{DET}$, can be processed to determine changes in the orientation about the sensitive axis that correspond to rotational motion.

For example, the rotation detection component 28 can include a mechanization processor that is configured to calculate the rotation angle about the sensitive axis of the NMR gyroscope system 10 based on the measured precession angle of the gyromagnetic isotope 16. As an example, the rotation detection component 28 can be configured to calculate the rotation angle about the sensitive axis of the vapor cell 12 based on the measured precession angle of the gyromagnetic isotope 16 that is indicated by the demodulated detection signal $O_{DET}$. For example, the detected precession angle of the gyromagnetic isotope 16 can be compared to a predetermined reference signal corresponding to an expected precession angle of the gyromagnetic isotope 16 in the stable magnetic field $B_Z$. Thus, the rotation of the vapor cell 12 can be calculated from a difference (e.g., a phase or frequency difference) between the measured precession angle of the gyromagnetic isotope 16 and the reference signal.

As described in the example of FIG. 1, the rotation angle about the sensitive axis of the NMR gyroscope system 10 can be determined in a more simplistic manner than in typical NMR gyroscope systems. Specifically, based on the implementation of providing the optical beam OPT at an offset angle relative to the magnetic field $B_Z$ that is aligned with the sensitive axis of the NMR gyroscope system 10, the optical beam OPT operates as both a pump beam to optically pump and polarize the alkali metal 14 and as a probe beam to determine the rotation of the NMR gyroscope system 10 about the sensitive axis. As a result, the NMR gyroscope system 10 can be implemented with only a single laser, as opposed to two or more lasers. Furthermore, the processing of the detection beam $O_{DET}$ to determine the rotation of the NMR gyroscope system 10 about the sensitive axis can be implemented in a more simplistic and cost effective manner, as it is not based on a Faraday rotation of a linearly polarized signal, as it is done for typical NMR gyroscope systems. Therefore, the NMR gyroscope system 10 can be implemented as a simplistic and more cost effective gyroscope, such as for guidance and navigation applications.

It is to be understood that the NMR gyroscope system 10 is not intended to be limited to the example of FIG. 1. As an example, the vapor cell 12 can include additional gyromagnetic isotopes beyond the gyromagnetic isotope 16, such as a total of two or three gyromagnetic isotopes (e.g., for stabilizing the magnetic field $B_Z$ and/or to calculate rotation about the sensitive axis). In addition, it is to be understood that the NMR gyroscope system 10 is demonstrated in the example of FIG. 1 simplistically for the sake of brevity, such that additional components can be included in the NMR gyroscope system 10. For example, the NMR gyroscope system 10 could also include additional components and optics to stabilize the magnetic field source 18 and/or the laser 20. Accordingly, the NMR gyroscope system 10 can be configured in a variety of ways.

Figure 2:
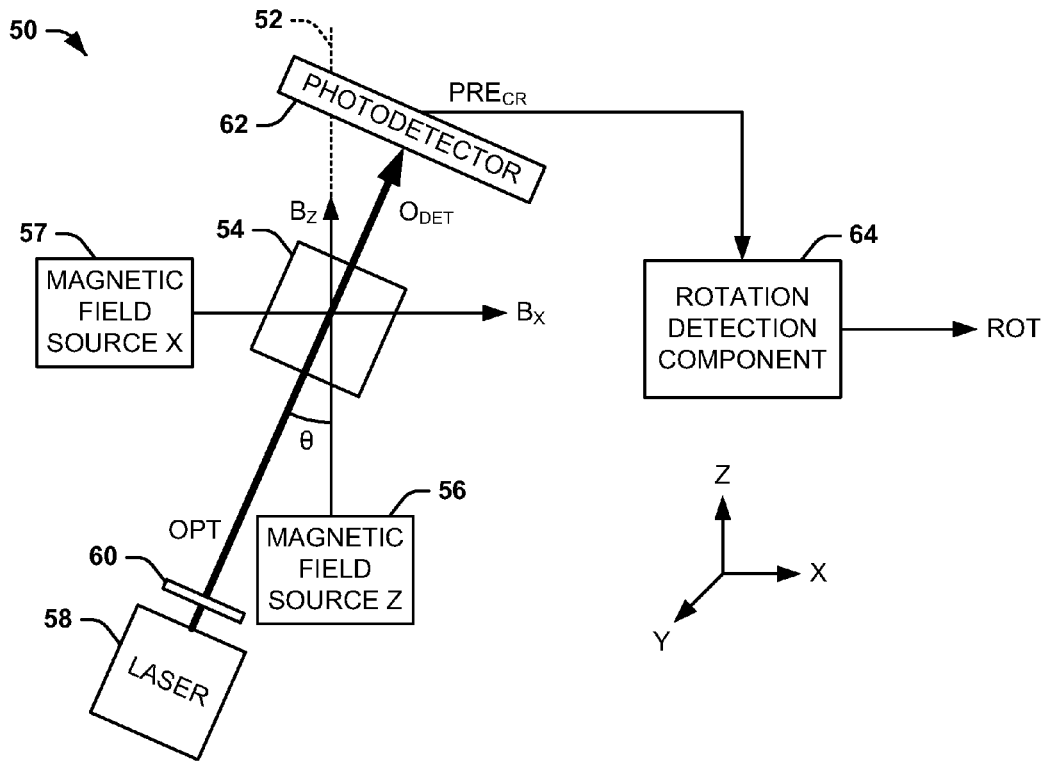
FIG. 2 illustrates another example of an NMR gyroscope system.

FIG. 2 illustrates another example of an NMR gyroscope system 50 in accordance with an aspect of the invention. The NMR gyroscope system 50 can be configured substantially similar to the NMR gyroscope system 10 in the example of FIG. 1. Specifically, the NMR gyroscope system 50 can be configured to measure a rotation angle ROT about a sensitive axis 52, which is demonstrated in the example of FIG. 2 as the Z-axis. Thus, the NMR gyroscope system 50 can be implemented in navigation systems for aircraft and/or spacecraft, and/or as part of a multi-axis gyroscope system, similar to as described previously in the example of FIG. 1. Therefore, reference is to be made to the example of FIG. 1 in the following description of the example of FIG. 2.

The NMR gyroscope system 50 includes the vapor cell 54, which can be arranged in any of a variety of shapes, such as cubical, cylindrical, or spherical. The vapor cell 54 includes the alkali metal 14 and the gyromagnetic isotope 16 (e.g., and at least one additional gyromagnetic isotope). The NMR gyroscope system 50 also includes a first magnetic field source 56 that generates the magnetic field $B_Z$ substantially uniformly through the vapor cell 54 along the Z-axis, and thus in a direction that is substantially parallel with the sensitive axis 52. Similar to the description above in the example of FIG. 1, the magnetic field source 56 can be configured as a magnetic solenoid that substantially surrounds the vapor cell 54.

In addition, the NMR gyroscope system 50 includes a second magnetic field source 57 configured to generate a stimulus magnetic field $B_X$ in a direction that is substantially orthogonal to the magnetic field $B_Z$ (e.g., along the X-axis). As an example, the magnetic field $B_X$ can have an AC component with a frequency that is substantially tuned to a resonant frequency of the gyromagnetic isotope 16, which can be much less than a frequency of an AC component of the magnetic field $B_Z$ (i.e., that can dictate the precession frequency of the alkali metal 14). Furthermore, the NMR gyroscope system 50 includes a laser 58 configured to generate the optical signal OPT which is directed through optics 60 (e.g., including a quarter-wave plate to circularly polarize the optical signal OPT) at the offset angle θ relative to the magnetic field $B_Z$ and which exits the vapor cell 54 as the detection beam $O_{DET}$. As an example, the offset angle θ can correspond to an optimum angle associated with a maximum SNR between minimum and maximum absorption of the optical beam OPT by the alkali metal 14 through a full period of precession of the alkali metal 14. For example, the offset angle θ can be approximately 26.56° in a configuration of the NMR gyroscope system 50 when the polarization of the alkali metal 14 is directly proportional to the intensity of the vector component of the optical signal OPT parallel to the magnetic field $B_Z$. Therefore, the intensity of the detection beam $O_{DET}$ corresponds to the precession of the alkali metal 14, as modified by the gyromagnetic isotope 16. Accordingly, as described herein, the intensity of the detection beam $O_{DET}$ can be indicative of rotation of the NMR gyroscope system 10 about the sensitive axis.

The optical signal OPT can spin polarize the alkali metal 14 to facilitate precession of the alkali metal 14 about the sensitive axis 52 in response to the magnetic field $B_Z$ and the stimulus field $B_S$. The optically spin-polarized alkali metal 14 creates a local net magnetic field ($B_L$) that can be substantially parallel with the magnetic field $B_Z$, and thus the sensitive axis 52. As an example, the local magnetic field $B_L$ from the optically spin-polarized alkali metal 14 can have a direction that is the same or opposite the substantially uniform magnetic field $B_Z$ (e.g., depending on the circular polarization direction of the optical pump beam OPT). A spin-exchange process causes the gyromagnetic isotope 16 to likewise obtain a net spin-polarization and to likewise precess in the vapor cell 54. The local magnetic field $B_L$ can have a net effect on the precession frequency of the gyromagnetic isotope 16. For example, the mass of the gyromagnetic isotope 16 can be determinative of the effect of the local magnetic field on the gyromagnetic isotope 16. As an example, different masses of the gyromagnetic isotope 16 and at least one other gyromagnetic isotope can cause a reduced mass shift in the coupling between the alkali metal 14 and the gyromagnetic isotope 16 while bound to each other in short lived molecules. Therefore, the gyromagnetic isotope 16 and the at least one other gyromagnetic isotope can experience different apparent local magnetic fields $B_L$ due to the difference in their respective interaction with the optically spin-polarized alkali metal 14.

As an example, once pumped by the optical beam OPT, the atoms that constitute the alkali metal 14 may rapidly lose a respective electron polarization, thus becoming substantially randomly oriented. The random orientation can occur, for example, as a result of collisions with other atoms, collisions with atoms that are not aligned with the magnetic field $B_Z$, and/or collisions with other atoms that are aligned with the magnetic field $B_Z$, such as based on a Cs—Xe spin-exchange collision process. Once the alkali metal 14 reaches a specific state and energy level as a result of interaction with the pump beam OPT, the alkali metal 14 experiences a force aligning it to the substantially uniform magnetic field $B_Z$. In the absence of any magnetic fields transverse to the sensitive axis 52, such as can be mitigated by an associated magnetic shield (not shown in the example of FIG. 2), the spin-exchange optically pumped atoms of the gyromagnetic isotope 16, such as Xe, may not precess as a coherent group, resulting in no net transverse-field precession. However, as described previously, the magnetic field $B_X$ provided along the X-axis can be tuned at the resonant Larmor frequency of the gyromagnetic isotope 16, thus causing the atoms of the gyromagnetic isotope 16 to precess as a group about the sensitive axis 52. As a result, a net torque can act on the spin of the gyromagnetic isotope 16 that, based on the oscillating characteristic of the magnetic field $B_X$, can be in resonance with a respective natural Larmor frequency, thus causing the spin-aligned atoms of the gyromagnetic isotope 16 to precess in phase. The magnitude of the torque on the electron spin of a fully pumped atom of the alkali metal 14 can be a function of the angle between a magnetic moment of the respective pumped atom and the substantially uniform magnetic field $B_Z$, as well as the magnitude of the magnetic field $B_X$.

The NMR gyroscope system 50 includes a photodetector 62 and a rotation detection component 64 that can each be part of the angular rotation sensor 24 in the example of FIG. 1. The photodetector 62 is configured to monitor the intensity of the detection beam $O_{DET}$ corresponding to the optical beam OPT exiting the vapor cell 54, thus generating a precession signal $PRE_{CR}$. As described previously, the modulated intensity of the detection beam $O_{DET}$ corresponds to the precession of the alkali metal 14, as modified by the gyromagnetic isotope 16. Therefore, the precession signal $PRE_{CR}$ can be an electric signal having a carrier frequency corresponding to the precession of the alkali metal 14 and an AC signal component having a significantly lesser frequency than the carrier frequency, and thus corresponding to the precession of the gyromagnetic isotope 16. Thus, the rotation detection component 64 can be configured to demodulate the precession signal $PRE_{CR}$ to determine the precession of the gyromagnetic isotope 16. Accordingly, changes in the precession angle of the gyromagnetic isotope 16, as detected in the demodulated precession signal $PRE_{CR}$, can be processed to determine changes in the orientation about the sensitive axis that correspond to the angular rotation ROT of the NMR gyroscope system 50.

Figure 3:
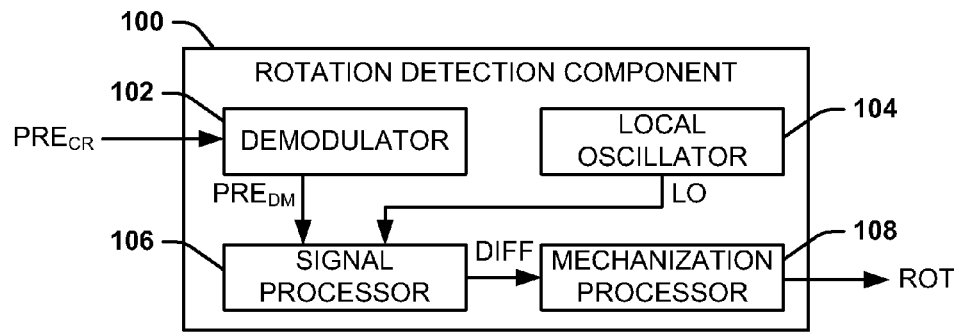
FIG. 3 illustrates an example of a rotation detection component.

FIG. 3 illustrates an example of a rotation detection component 100. The rotation detection component 100 can correspond to the rotation detection component 64 in the example of FIG. 2. Therefore, reference is to be made to the example of FIG. 2 in the following description of the example of FIG. 3.

The rotation detection component 100 includes a demodulator 102 configured to demodulate the precession signal $PRE_{CR}$ provided by the photodetector 62. As an example, the demodulator 102 can be configured to demodulate the precession signal $PRE_{CR}$ at a frequency corresponding to the AC component of the magnetic field $B_Z$, and thus the frequency of the precession of the alkali metal 14. Therefore, the demodulator 102 is configured to remove the carrier frequency of the precession signal $PRE_{CR}$ to generate a signal $PRE_{DM}$ that can have an AC component corresponding to the precession of the gyromagnetic isotope 16.

The rotation detection component 100 includes a local oscillator 104 and a signal processor 106. The local oscillator 104 is configured to generate a reference signal LO having a predetermined frequency. For example, the predetermined frequency of the reference signal LO can correspond to an expected precession frequency of the gyromagnetic isotope 16 in the stable magnetic field $B_Z$. The signal $PRE_{DM}$ and the reference signal LO are each provided to the signal processor 106. The signal processor 106 can be configured to compare the signal $PRE_{DM}$ and the reference signal LO. As an example, the signal processor 106 can compare a phase and/or a frequency of each of the signal $PRE_{DM}$ and the reference signal LO. As a result of the comparison, the signal processor 104 can generate a difference signal DIFF corresponding to a difference between the phase and/or the frequency of the signal $PRE_{DM}$ and the reference signal LO. The rotation detection component 100 further includes a mechanization processor 108 that is configured to calculate the rotation angle ROT about the sensitive axis of the NMR gyroscope system 50 based on the difference between the signal $PRE_{DM}$ and the reference signal LO. Accordingly, as described herein, the rotation of the NMR gyroscope system 50 about the sensitive axis 52 can be determined based on the intensity of the detection beam $O_{DET}$ corresponding to the circularly-polarized optical beam OPT that is provided through the vapor cell 54 to polarize the alkali metal 14 to facilitate precession of the alkali metal 14 and the gyromagnetic isotope 16.

Figure 4:
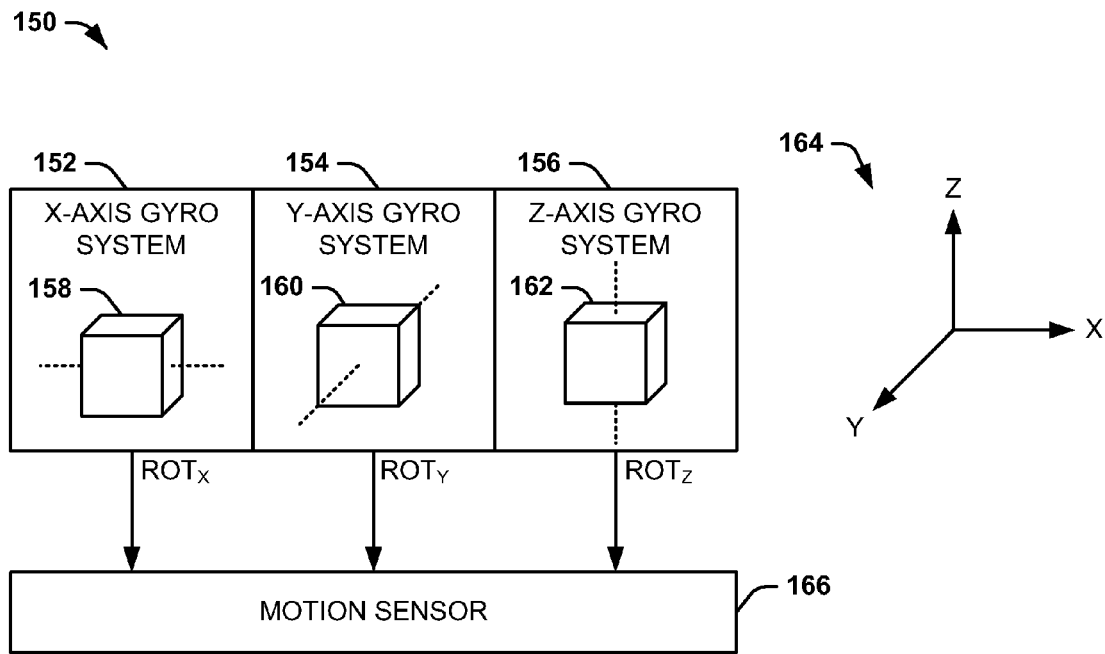
FIG. 4 illustrates an example of a three-axis gyroscope system.

FIG. 4 illustrates an example of a three-axis gyroscope system 150 in accordance with an aspect of the invention. As an example, the three-axis gyroscope system 150 can be implemented in any of a variety of navigation control systems, such as for aircraft and/or spacecraft, or device to monitor yaw, pitch, and roll rotational motion information.

The three-axis gyroscope system 150 includes an X-axis gyroscope system 152, a Y-axis gyroscope system 154, and a Z-axis gyroscope system 156. In the example of FIG. 4, the X-axis gyroscope system 152 can have a sensitive axis about the X-axis, the Y-axis gyroscope system 154 can have a sensitive axis about the Y-axis, and the Z-axis gyroscope system 156 can have a sensitive axis about the Z-axis. The axes of rotation of the respective NMR vapor cells 158, 160, and 162 are indicated in the example of FIG. 4 by a Cartesian coordinate system 164. As an example, each of the X-axis, Y-axis, and Z-axis gyroscope systems 152, 154, and 156 can be configured substantially similar to the NMR gyroscope system 50 in the example of FIG. 2. Thus, each of X-axis, Y-axis, and Z-axis gyroscope systems 152, 154, and 156 can be configured to determine respective rotation angles $ROT_X$, $ROT_Y$, and $ROT_Z$ about each of the respective X, Y, and Z axes based on an intensity of a respective detection beam $O_{DET}$ corresponding to a respective circularly-polarized optical beam OPT that is provided through the respective vapor cells 158, 160, and 162 to polarize alkali metal to facilitate precession of the alkali metal and gyromagnetic isotopes therein.

In the example of FIG. 4, each of the X-axis, Y-axis, and Z-axis gyroscope systems 152, 154, and 156 are demonstrated as outputting signals that include the respective rotation angles $ROT_X$, $ROT_Y$, and $ROT_Z$ to a motion sensor 166. The motion sensor 166 can thus be configured to determine an aggregate three-axis rotational motion of the associated vehicle or device that includes the three-axis gyroscope system 150. Therefore, the yaw, pitch, and roll of the associated vehicle or device that includes the three-axis gyroscope system 150 can be determined. Accordingly, the motion sensor 166 can be configured to display, output, and/or report the three-axis rotational motion of the associated vehicle or device that includes the three-axis gyroscope system 150.

Figure 5:
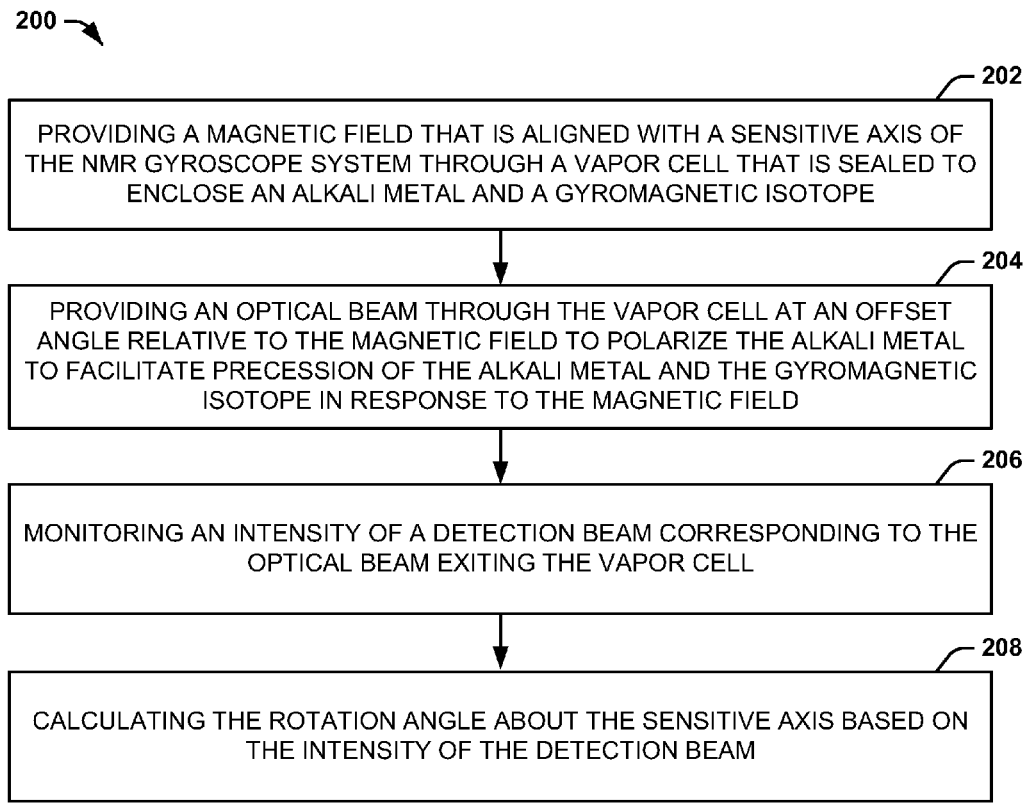
FIG. 5 illustrates an example of a method for determining a rotation angle about a sensitive axis in an NMR gyroscope system.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for determining a rotation angle (e.g., the signal ROT) about a sensitive axis in an NMR gyroscope system (e.g., the NMR gyroscope system 10). At 202, a magnetic field (e.g., the magnetic field $B_z$) that is aligned with a sensitive axis (e.g., the sensitive axis 52) of the NMR gyroscope system is provided through a vapor cell (e.g., the vapor cell 12) that is sealed to enclose an alkali metal (e.g., the alkali metal 14) and a gyromagnetic isotope (e.g., the gyromagnetic isotope 16). At 204, an optical beam (e.g., the optical beam OPT) is provided through the vapor cell at an offset angle (e.g., the offset angle θ) relative to the magnetic field to polarize the alkali metal to facilitate precession of the alkali metal and the gyromagnetic isotope in response to the magnetic field. At 206, an intensity of a detection beam (e.g., the detection beam $O_{DET}$) corresponding to the optical beam exiting the vapor cell is monitored. At 208, a rotation angle about the sensitive axis is calculated based on the intensity (e.g., as monitored by the photodetector 26) of the detection beam.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A nuclear magnetic resonance (NMR) gyroscope system comprising:
    a vapor cell that is sealed to enclose an alkali metal and a gyromagnetic isotope;
    a magnetic field source configured to generate a magnetic field that is aligned with a sensitive axis of the NMR gyroscope system and which is provided through the vapor cell to cause the alkali metal and the gyromagnetic isotope to precess;
    a laser configured to generate an optical beam that polarizes the alkali metal in the vapor cell to facilitate the precession of the alkali metal and the gyromagnetic isotope, the optical beam being provided through the vapor cell at an offset angle relative to the magnetic field, the offset angle being based on a signal-to-noise ratio associated with absorption of the optical beam by the alkali metal; and
    an angular rotation sensor configured to calculate a rotation angle about the sensitive axis based on a measured characteristic of a detection beam corresponding to the optical beam exiting the vapor cell, the characteristic being associated with the precession of the gyromagnetic isotope.

2. The system of claim 1, wherein the angular rotation sensor comprises a photodetector configured to monitor an intensity of the detection beam corresponding to an absorption of the optical beam by the alkali metal, the detection beam having a carrier frequency corresponding to a precession frequency of the alkali metal.

3. The system of claim 1, wherein the offset angle corresponds to an optimum angle associated with a maximum signal-to-noise ratio between minimum and maximum absorption of the optical beam by the alkali metal through a full period of precession of the alkali metal.

4. The system of claim 1, wherein the magnetic field source is a first magnetic field source configured to generate a first magnetic field, the system further comprising a second magnetic field source configured to generate a second magnetic field in a direction orthogonal with respect to the first magnetic field, the second magnetic field having a frequency corresponding to a resonant frequency of the gyromagnetic isotope.

5. The system of claim 1, wherein the angular rotation sensor comprises a rotation detection component configured to demodulate the detection beam and to calculate the rotation angle based on the characteristic of the demodulated detection beam.

6. The system of claim 5, wherein the rotation detection component is configured to demodulate the detection beam at a frequency corresponding to a precession frequency of the alkali metal.

7. The system of claim 5, wherein a frequency of the demodulated detection beam corresponds to a precession frequency of the gyromagnetic isotope.

8. The system of claim 7, wherein the rotation detection component further comprises a local oscillator configured to generate a reference signal, wherein the rotation detection component is configured to calculate the rotation angle based on comparing the precession frequency of the gyromagnetic isotope with the reference signal.

9. A three-axis gyroscope system comprising the NMR gyroscope system of claim 1.

10. A method for determining a rotation angle about a sensitive axis in a nuclear magnetic resonance (NMR) gyroscope system, the method comprising:
    providing a magnetic field that is aligned with a sensitive axis of the NMR gyroscope system through a vapor cell that is sealed to enclose an alkali metal and a gyromagnetic isotope;
    providing an optical beam through the vapor cell at an offset angle relative to the magnetic field to polarize the alkali metal to facilitate precession of the alkali metal and the gyromagnetic isotope in response to the magnetic field, the offset angle being based on a signal-to-noise ratio associated with absorption of the optical beam by the alkali metal;
    monitoring an intensity of a detection beam corresponding to the optical beam exiting the vapor cell; and
    calculating the rotation angle about the sensitive axis based on the intensity of the detection beam.

11. The method of claim 10, wherein calculating the rotation angle comprises demodulating the detection beam at a frequency corresponding to the precession frequency of the alkali metal to generate a demodulated signal having a frequency corresponding to a precession frequency of the gyromagnetic isotope.

12. The method of claim 11, wherein calculating the rotation angle further comprises:
    comparing the demodulated signal with a reference signal having a predetermined frequency; and
    calculating the rotation angle about the sensitive axis based on a difference between the demodulated signal and the reference signal.

13. The method of claim 10, wherein providing the magnetic field comprises providing a first magnetic field that is aligned with the sensitive axis of the NMR gyroscope system, the method comprising providing a second magnetic field in a direction orthogonal with respect to the first magnetic field, the second magnetic field having a frequency corresponding to a resonant frequency of the gyromagnetic isotope.

14. The method of claim 10, wherein providing the optical beam comprises providing the optical beam through a set of optics to circularly polarize the optical beam and to direct the optical beam at the offset angle corresponding to an optimum angle associated with a maximum signal-to-noise ratio between minimum and maximum absorption of the optical beam by the alkali metal through a full period of precession of the alkali metal.

15. A nuclear magnetic resonance (NMR) gyroscope system comprising:
   a vapor cell that is sealed to enclose an alkali metal and a gyromagnetic isotope;
   a magnetic field source configured to generate a first magnetic field that is aligned with a sensitive axis of the NMR gyroscope system and a second magnetic field orthogonal with respect to the first magnetic field, the first and second magnetic fields being provided through the vapor cell to cause the alkali metal and the gyromagnetic isotope to precess;
   a laser configured to generate an optical beam that is provided through the vapor cell at an offset angle relative to the first magnetic field and which polarizes the alkali metal in the vapor cell to facilitate the precession of the alkali metal and the gyromagnetic isotope, the offset angle being based on a signal-to-noise ratio associated with absorption of the optical beam by the alkali metal; and
   an angular rotation sensor configured to calculate a rotation angle about the sensitive axis based on an intensity of a detection beam corresponding to the optical beam exiting the vapor cell that is measured via a photodetector.

16. The system of claim 15, wherein the offset angle corresponds to an optimum angle associated with a maximum signal-to-noise ratio between minimum and maximum absorption of the optical beam by the alkali metal through a full period of precession of the alkali metal.

17. The system of claim 15, wherein the angular rotation sensor comprises a rotation detection component configured to demodulate the detection beam and to calculate the rotation angle based on a frequency of the demodulated detection beam.

18. The system of claim 17, wherein the rotation detection component is configured to demodulate the detection beam at a frequency corresponding to a precession frequency of the alkali metal to provide a demodulated detection signal having a precession frequency of the gyromagnetic isotope.

19. The system of claim 18, wherein the rotation detection component further comprises a local oscillator configured to generate a reference signal, wherein the rotation detection component is configured to calculate the rotation angle based on comparing the precession frequency of the gyromagnetic isotope with the reference signal.

* * * * *